United States Patent [19]

Watanabe et al.

[11] Patent Number: 4,722,159
[45] Date of Patent: Feb. 2, 1988

[54] CULTIVATION OF MUSHROOMS

[75] Inventors: Masashi Watanabe, Osaka; Masato Ogura, Ehime; Seigo Ouchi, Osaka, all of Japan

[73] Assignee: Sumitomo Chemical Co., Ltd., Osaka, Japan

[21] Appl. No.: 18,784

[22] Filed: Feb. 24, 1987

Related U.S. Application Data

[63] Continuation of Ser. No. 644,283, Aug. 27, 1984, abandoned.

[30] Foreign Application Priority Data

Aug. 30, 1983 [JP] Japan .................. 58-160168

[51] Int. Cl.⁴ .................................. A01G 1/04
[52] U.S. Cl. ........................................ 47/1.1
[58] Field of Search .................. 47/1.1, 9, 56, 58; 71/5

[56] References Cited

U.S. PATENT DOCUMENTS

| | | | |
|---|---|---|---|
| 3,981,100 | 9/1976 | Weaver et al. | 47/58 |
| 4,079,543 | 3/1978 | Stoller | 47/1.1 |
| 4,170,842 | 10/1979 | Stoller | 47/1.1 |
| 4,313,278 | 2/1982 | Pointing et al. | 47/1.1 |
| 4,534,781 | 8/1985 | Wu et al. | 71/5 |

FOREIGN PATENT DOCUMENTS

| | | | |
|---|---|---|---|
| 3207727 | 12/1982 | Fed. Rep. of Germany . | |
| 830661 | 10/1938 | France | 47/1.1 |
| 1602801 | 2/1971 | France . | |
| 2443798 | 8/1980 | France | 47/1.1 |
| 50689 | 11/1983 | Japan | 47/1.1 |
| 520355 | 4/1940 | United Kingdom | 47/1.1 |

OTHER PUBLICATIONS

The Mushroom Journal, "Separating Spawn-Run Casing from Compos", J. J. Hesling, pp. 141, 142.

Primary Examiner—Robert A. Hafer
Assistant Examiner—Danton DeMille
Attorney, Agent, or Firm—Sughrue, Mion, Zinn, Macpeak & Seas

[57] ABSTRACT

Artificial cultivation of mushrooms is described, comprising growing the mushrooms in a culture medium comprising a fungal bed and a covering soil having laid therebetween a water-absorbing sheet composed of a porous sheet and a water-absorbing polymeric substance. The present invention yields various advantages; for example, even if the frequency of water-spray is considerably reduced, the water content of the covering soil can be maintained at 70 to 80%. Thus, it permits production of high quality mushrooms in high yields.

8 Claims, 3 Drawing Figures

CULTIVATION OF MUSHROOMS

This is a continuation of application Ser. No. 644,283 filed Aug. 27, 1984 now abandoned.

FIELD OF THE INVENTION

The present invention relates to artificial cultivation of mushrooms. More particularly, the invention relates to the method of growing mushrooms in a culture medium comprising a fungal bed and a covering soil having laid therebetween a water-absorbing sheet composed of a porous substrate and a water-absorbing polymeric substance.

BACKGROUND OF THE INVENTION

With the recent spread of artificial cultivation of mushrooms, they are now supplied abundantly. However, a satisfactory method of cultivation has not been established although various improvements have been made.

In general, in artificial cultivation of mushrooms, the fungal bed exerts great influences on the yield and quality of the mushrooms. Thus, many investigations have been made on the method of cultivation. For example, the present inventors have discovered that in artificial cultivation of mushrooms growing on the fungal bed only, such as *Flammulinaa velupipes Karst*, *Lyophyllum aggregatum*, and *Pholipa nameko S. Itoh et Imai*, addition of water-absorbing polymeric substances to the fungal bed produces excellent effects (see Japanese Patent Application (OPI) No. 212722/83) (the term "OPI" as used herein refers to a "published unexamined Japanese patent application", hereinafter the same).

It is known, however, that in artificial cultivation of mushrooms, such as *Agaricus campestris*, requiring a fungal bed and a covering soil, unlike the artificial cultivation of *Flammulinaa velupipes Karst*, etc., the covering soil as well as the fungal bed exert great influences on stabilization of cultivation, yield, and quality (e.g., form, size, etc.) and, therefore, the proper choice of the covering soil and fungal bed is of great importance. It has been desired to develop a method of cultivation which permits stable production of high quality mushrooms in high yields.

In artificial cultivation of these mushrooms requiring the fungal bed and covering soil, it is said that the covering soil not only prevents abrupt changes in the temperature and humidity of the inner part of the fungal bed, thereby protecting mycelia, but also accelerates the formation of fruit body primodia by the physical and chemical action of soil (e.g., retention of gases, multiplication of microorganisms, retention of water, passage of air, etc.). Therefore, a suitable covering soil is such as to permit easy passage of air and also to have a proper water-retention capability, which are essential for the growth of mycelia and the differentiation and growth of fruit body primodia.

An example of the covering soil satisfying the above-described requirements is a clay loam soil (clay content, about 40%). This kind of soil, however, when used as a covering soil, suffers from disadvantages in that the aggregate structure of soil is gradually broken by repeated water-spray, resulting in a reduction in air-permeability and water-retention of the soil and, thus, the formation of emergence of fruit body is reduced, leading to a drop in yield.

Peatmoss is relatively superior in water-retention, but its air-permeability is too high. When, therefore, peatmoss is used as a covering soil, the formation of fruit body occurs excessively and, therefore, high quality mushrooms cannot be obtained unless thinning is applied at the time of the emergence of fruit body. Moreover, the harvest time is shortened and the yield drops.

In order to eliminate the above-described problems, an improved method has been proposed in which a small amount of peatmoss is added to soil. This method, however, fails to completely overcome the problems. Thus, at the present time, there is not available a method of cultivation which permits stable production of high quality mushrooms in high yields.

SUMMARY OF THE INVENTION

As a result of studies on a method of cultivation which permits production of high quality mushrooms in high yields, it has been found that if a water-absorbing sheet having a water-retention capability and air-permeability composed of a porous substrate and a water-absorbing polymeric substance is laid between a fungal bed and a covering soil, there can be obtained suitable passage of air (supply of oxygen) and proper water-retention, which are essential for the growth of mycelia, as a result of which the most suitable environment for artificial cultivation of mushrooms is produced and thus high quality mushrooms can be obtained stably in high yields.

The present invention relates to a method of artificial cultivation of mushrooms utilizing a culture medium comprising a fungal bed and a covering soil having laid therebetween a water-absorbing sheet having a water-retention capability and air-permeability, composed of a porous substrate and a water-absorbing polymeric substance.

DETAILED DESCRIPTION OF THE INVENTION

Figure 1:
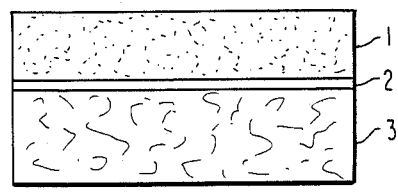
FIG. 1 illustrates a cross-sectional view of the cultivation bed used in the invention.

The water-absorbing sheet as used herein is composed of a porous substrate and a water-absorbing substance and has a water-retention capability and air-permeability.

As the porous substrate, any substrate can be used as long as it is porous. Preferred examples include fibrous materials such as paper, woven fabrics, knitted fabrics, non-woven fabrics, and felt, and polymer foams such as a polyurethane foam.

Such a water-absorbing sheet can be suitably perforated and then put into practical uses.

The water-absorbing substance which is used in the invention is a water-insoluble substance absorbing water and swelling on coming into contact with water. It is preferred that the substance be capable of absorbing water of 10 times or more the weight thereof. The water-absorbing substance may be natural or synthetic.

Synthetic water-absorbing substances which can be used include water-absorbing polymeric electrolytes such as a starch/acrylic acid (salt) graft copolymer, a salt of styrene/maleic anhydride copolymer, a cross-linked polyacrylic acid (salt), a modified, cross-linked product of a polyvinyl alcohol/maleic anhydride reaction product, a saponified product of copolymers comprising a vinyl ester/ethylenically unsaturated carboxylic acid or derivatives thereof, a modified, cross-linked product of an isoprene/maleic anhydride copolymer, a sulfonated polyvinyl alcohol, and a saponified product of copolymers comprising a vinyl ester/unsaturated dicarboxylic acid or derivatives thereof; and water-absorbing polymeric nonelectrolytes such as a cross-linked polyalkylene oxide, a cross-linked polyvinyl alcohol, a cross-linked polyamide, and a cross-linked product of starch. Among them, water-absorbing polymeric electrolytes are preferred in respect of water-absorbing capacity. Of these substances, those containing a carboxyl group or a hydroxyl group are preferred in view of their air-permeability and water-retention and, furthermore, from an economic standpoint. For the growth of mycelia, it is desirable for the carboxyl group to be in the form of carboxylic acid or a sodium, potassium or ammonium salt, or a mixture thereof.

Of the above-described water-absorbing polymeric substances, a saponified product of copolymers comprising a vinyl ester/ethylenically unsaturated carboxylic acid or derivatives thereof, a modified, cross-linked product of a polyvinyl alcohol/maleic anhydride reaction product, a saponified product of copolymers comprising a vinyl ester/unsaturated dicarboxylic acid or derivatives thereof, a cross-linked polyacrylic acid (salt), and a cross-linked polyalkylene oxide are most suitable for use in the present invention since their hydrogels after absorption of water are high in strength and they are difficult to rot.

In connection with the form of the water-absorbing polymeric substance, it is used in a powdery, granular, fibrous, or flaky form. If it becomes paste-like on absorbing water or in the state that it is used, passage of air is undesirably reduced, causing excessive humidification.

The water-absorbing sheet which is used in this invention is composed of a porous substrate and a water-absorbing polymeric substance. This water-absorbing sheet is not critical in its method of preparation; that is, it can be prepared in any suitable manner such as a method in which a water-absorbing polymeric substance is sprayed on a substrate with a suitable adhesive as a binder, and a method in which a water-absorbing polymeric substance is dispersed in water or a suitable organic solvent to prepare a dispersion which is then used for coating or impregnating a substrate, followed by drying.

The thickness of the water-absorbing sheet and the amount of the water-absorbing polymeric substance added to the water-absorbing sheet are determined experimentally because they vary depending on the properties of the substrate of the water-absorbing sheet, the water-absorbing capability of the water-absorbing polymeric substance, the type of the covering soil material used, and so forth. In general, the water-absorbing capability of the water-absorbing sheet is suitably from 50 to 5,000 ml/m² and preferably from 1,000 to 3,000 ml/m². If the water-absorbing capability is too low, the desired effect cannot be obtained. On the other hand, if it is too high, excessive humidification is liable to occur. This will seriously reduce the emergence of fruit body and easily cause the incidence of diseases.

Figure 2A:
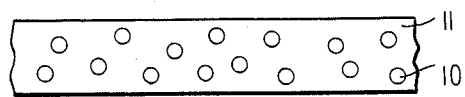
FIGS. 2(A) and 2(B) show cross-sectional views of the water-absorbing sheet used in the invention with and without holes.
Figure 2B:
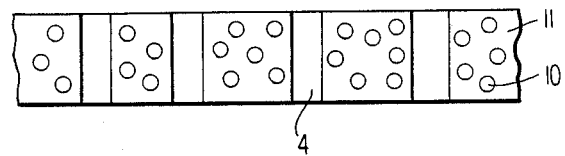
Figure 3:
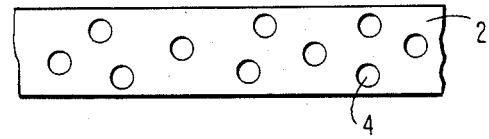
FIG. 3 shows a planar view of the water-absorbing sheet used in the invention.

FIG. 1 illustrates the cultivation bed used in the invention. A fungal bed 3 has placed thereon the water-absorbing sheet 2 and this is in turn covered with a covering soil 1. As shown in FIGS. 2(A) and 2(B) the water-absorbing polymeric material 10 is placed in the porous substrate 11. Further, as shown in FIG. 3 and illustrated by Example 2, the water-absorbing sheet may have holes 4 therein.

An example of use of the water-absorbing sheet in the cultivation of *Agaricus campestris* according to the present invention will hereinafter be explained.

A water-absorbing sheet is uniformly placed on the surface of a fungal bed and covered with a conventionally used covering soil material (such as soil, peatmoss, or a mixture thereof). A covering soil material with which a water-absorbing polymeric substance is uniformly mixed can also be used for the soil-covering. It is preferred that the water-absorbing sheet and covering soil material be applied before the fungal bed is filled with mycelia. Immediately after the application of the covering soil, water is sprayed so as to maintain the water content of the covering soil material at 70 to 80%. Control of the water content of the covering soil by spraying water is very important for the production of high quality mushrooms in high yields.

Other operations such as preparation of compost, accumulation, dig and re-accumulation, and seeding can be carried out by any of known techniques; that is, no modification is required in the practice of the method of the present invention. In accordance with the method of the present invention, however, even if the frequency of water-spray is considerably reduced, the water content of the covering soil can be maintained at 70 to 80%.

Some of other advantages of the present invention are given below.

(1) The optimum water content of a culture medium can be extended and the maintenance of water is made easy.

(2) Suitable air-permeability and water-retention of a culture medium can be maintained over long periods of time.

(3) Emergence of fruit body and the formation of fruit body can be stabilized over long periods of time.

Thus, as described above, the method of the present invention permits artificial cultivation of high quality mushrooms in high yields and with ease.

The present invention is described in greater detail with reference to the following examples although it is not limited thereto.

EXAMPLE 1

Compost was placed in a culture frame in a thickness of about 15 cm to prepare a bed. This compost was fermented and was allowed to generate heat. When the temperature of the compost bed dropped to 24° C. or lower, the compost bed was planted with seed fungi of *Agaricus campestris*. During the growth of mycelia, the temperature of the compost bed was maintained at from 20° to 23° C. When the seed fungi grew, a water-absorbing sheet which had been prepared in advance (namely, the water-absorbing sheet was prepared by uniformly spraying a paper having a basis weight of 20 g/m² with a spherical, granular, water-absorbing polymeric substance, a saponified product of copolymers comprising a vinyl ester/acrylic acid derivatives (IGETA GEL FS, a registered trademark of Sumitomo Chemical Co., Ltd.; average particle size: 200μ, water-absorbing capacity: 500 g/g) in an amount of 5 g/m² and adhering it with an adhesive such that the water-absorbing polymeric substance does not drop from the paper) was placed on the fungal bed. Thereafter, a clay loam soil which had been adjusted to pH 7.5 with slaked lime was covered on the water-absorbing sheet and made even in a thickness of about 3.5 cm without pressing it.

Immediately after the application of the covering soil, water was sprayed thereon. During the period of cultivation, the temperature in a cultivation room and the water content of the covering soil were adjusted appropriately, and air-ventilation was performed sufficiently, thereby undergoing the cultivation of *Agaricus campestris*.

EXAMPLE 2

Cultivation of *Agaricus campestris* was carried out in the same manner as in Example 1 except that a water-absorbing sheet prepared by providing holes which are 10 mm$\phi$ in diameter in the number of 400 per m$^2$ on the water-absorbing sheet prepared in Example 1 was used.

COMPARATIVE EXAMPLE

Cultivation of *Agaricus campestris* was carried out in the same manner as in Example 1 except that only a pH-adjusted clay loam soil was used as the covering soil and that no water-absorbing sheet was used.

The following were measured: (1) the frequency of water-spray, (2) the yield of fruit body of *Agaricus campestris*, and (3) the harvest time of *Agaricus campestris*. The results are shown in the Table.

TABLE

| | Method of the Invention | | Conventional Method Comparative |
|---|---|---|---|
| | Example 1 | Example 2 | Example |
| Frequency of Water-Spray | Sufficient to be about 30% reduction of that in the conventional method | Sufficient to be about 20% reduction of that in the conventional method | — |
| Yield of Fruit Body (kg/m$^3$) | 25.5 | 20.4 | 15.0 |
| Harvest Time (days) | 100 | 90 | 70 |

It can be seen in the Table that in the invention *Agaricus campestris* can be obtained stably in a high yield over a long harvest time as compared with the case of the conventional method.

While the invention has been described in detail and with reference to specific embodiments thereof, it will be apparent to one skilled in the art that various changes and modifications can be made therein without departing from the spirit and scope thereof.

What is claimed is:

1. A culture medium for *Agaricus campestris* comprising a fungal bed and a covering soil having laid therebetween a water-absorbing sheet composed of (a) a porous substrate and (b) a water-absorbing polymeric substance containing a carboxyl group in the molecule thereof and capable of absorbing water of at least 10 times the weight thereof and swelling.

2. A method for cultivating *Agaricus campestris* comprising placing a water-absorbing sheet composed of (a) a porous substrate and (b) a water-absorbing polymeric substance containing a carboxyl group in the molecule thereof and capable of absorbing water of at least 10 times the weight thereof and swelling on a fungal bed where mycelia of *Agaricus campestris* have grown, and covering with a covering soil on the water-absorbing sheet.

3. A method as claimed in claim 2, wherein the porous substrate is one selected from the group consisting of paper, a woven fabric, a knitted fabric, a non-woven fabric or felt.

4. A method as claimed in claim 2, wherein the water-absorbing polymeric substance contains a hydroxyl group in the molecule thereof.

5. A method as claimed in claim 2, wherein the carboxyl group is in the form of carboxylic acid.

6. A method as claimed in claim 2, wherein the porous substrate is a polymer foam.

7. A method as claimed in claim 2, wherein the carboxyl group is in the form of one selected from the group consisting of sodium, potassium, and ammonium.

8. A method as claimed in claim 2, wherein the carboxyl group is in the form of a mixture of carboxylic acids, a mixture of carboxylic acid salts or a mixture of a carboxylic acid and a salt thereof.

* * * * *